United States Patent
Vignet (10) Patent No.: US 9,558,169 B2
(45) Date of Patent: Jan. 31, 2017

(54) HIERARCHICAL GROUPING COLUMNS

(75) Inventor: Peter Vignet, San Francisco, CA (US)

(73) Assignee: SAP SE, Walldorf (DE)

( * ) Notice: Subject to any disclaimer, the term of this patent is extended or adjusted under 35 U.S.C. 154(b) by 1575 days.

(21) Appl. No.: 11/943,248

(22) Filed: Nov. 20, 2007

(65) Prior Publication Data

US 2009/0132560 A1    May 21, 2009

(51) Int. Cl.
*G06F 17/30* (2006.01)
*G06F 17/24* (2006.01)

(52) U.S. Cl.
CPC ........... *G06F 17/245* (2013.01); *G06F 17/246* (2013.01)

(58) Field of Classification Search
CPC   G06F 17/30554; G06F 17/245; G06F 17/246; G06F 17/30392
USPC .......................................... 707/763, 999.101
See application file for complete search history.

(56) References Cited

U.S. PATENT DOCUMENTS

| | | | |
|---|---|---|---|
| 5,781,896 A * | 7/1998 | Dalal | 707/2 |
| 5,812,840 A * | 9/1998 | Shwartz | 707/999.004 |
| 6,360,218 B1 * | 3/2002 | Zander et al. | 707/999.2 |
| 6,496,819 B1 * | 12/2002 | Bello | G06F 17/30454 |
| 6,553,370 B1 * | 4/2003 | Andreev et al. | 707/E17.012 |
| 7,103,608 B1 * | 9/2006 | Ozbutun et al. | 707/604 |
| 7,171,427 B2 * | 1/2007 | Witkowski et al. | |
| 7,418,431 B1 * | 8/2008 | Nies | G06Q 10/06 702/2 |
| 7,779,000 B2 * | 8/2010 | Vigesaa et al. | 707/722 |
| 7,831,539 B2 * | 11/2010 | Folting et al. | 707/600 |
| 2002/0077997 A1 * | 6/2002 | Colby et al. | 707/1 |
| 2002/0111964 A1 * | 8/2002 | Chen et al. | 707/513 |
| 2003/0088558 A1 * | 5/2003 | Zaharioudakis | G06F 17/30457 |
| 2003/0188256 A1 * | 10/2003 | Aureglia et al. | 715/503 |
| 2003/0213316 A1 * | 11/2003 | Harvey | 73/866.4 |
| 2004/0243616 A1 * | 12/2004 | Benhase et al. | 707/102 |
| 2005/0021538 A1 * | 1/2005 | Meyers et al. | 707/100 |
| 2005/0039033 A1 * | 2/2005 | Meyers | G06F 17/30392 713/193 |
| 2005/0097100 A1 * | 5/2005 | Galindo-Legaria et al. | 707/3 |
| 2005/0108199 A1 * | 5/2005 | Ellis et al. | 707/2 |
| 2005/0138001 A1 * | 6/2005 | Mittal et al. | 707/2 |
| 2005/0149542 A1 * | 7/2005 | Cosic | 707/100 |
| 2006/0075328 A1 * | 4/2006 | Becker et al. | 715/503 |
| 2007/0038495 A1 * | 2/2007 | Miner | 705/8 |
| 2007/0061369 A1 * | 3/2007 | Folting et al. | 707/200 |
| 2007/0083515 A1 * | 4/2007 | Gwizdaloski | 707/7 |
| 2007/0112724 A1 * | 5/2007 | Beach | G06F 17/30286 |
| 2007/0136286 A1 * | 6/2007 | Webster et al. | 707/7 |
| 2007/0233691 A1 * | 10/2007 | Chaushev | 707/10 |
| 2008/0295038 A1 * | 11/2008 | Helfman et al. | 715/853 |

(Continued)

OTHER PUBLICATIONS

"Extending Enterprise Applications with Microsoft Outlook: Architectural Design", Jan. 2006, Microsoft Corporation.*

(Continued)

*Primary Examiner* — Apu Mofiz
*Assistant Examiner* — Sheryl Holland (57) ABSTRACT

A system and process that automatically responds to changes in displayed table data to determine and reestablish a hierarchy for the table. A column hierarchy order component checks each column of a table to determine the number of groupings of entries and reorders the columns based on the number of groupings. A column order at the time a table is loaded is saved and can be used to restore that original order.

7 Claims, 5 Drawing Sheets

(56) References Cited

U.S. PATENT DOCUMENTS

2009/0132533 A1* 5/2009 Vignet .............................. 707/7
2010/0082536 A1* 4/2010 Cosic ........................... 707/610

OTHER PUBLICATIONS

Koratamaddi et al., "Oracle Database 10g: SQL Fundamentals I", 2006, Oracle.*

* cited by examiner

|   | Name | SubName | From | To |
|---|------|---------|------|-----|
| ▽ |      |         |      |     |
|   | Country_0 | State_0 | Town_0 | Town_1 |
|   |       |         | Town_1 | Town_2 |
|   |       |         | Town_2 | Town_3 |
|   |       | State_1 | Town_0 | Town_2 |
|   |       |         | Town_1 | Town_3 |
|   |       |         | Town_2 | Town_4 |
|   |       | State_2 | Town_0 | Town_3 |
|   |       |         | Town_1 | Town_4 |
|   |       |         | Town_2 | Town_5 |
|   | Country_1 | State_0 | Town_0 | Town_2 |
|   |       |         | Town_1 | Town_3 |
|   |       |         | Town_2 | Town_4 |
|   |       | State_1 | Town_0 | Town_3 |
|   |       |         | Town_1 | Town_3 |
|   |       |         | Town_2 | Town_5 |

Row 1 of 27

FIG. 4

|   | Name ⬍ | SubName ⬍ | From ⬍ | To ⬍ |
|---|---|---|---|---|
| ▽ |  |  |  |  |
|   | Country_0 | State_0 | Town_0 | Town_1 |
|   |   | State_1 |   | Town_2 |
|   |   | State_2 |   | Town_3 |
|   | Country_1 | State_0 |   | Town_2 |
|   |   | State_1 |   | Town_3 |
|   |   | State_2 |   | Town_4 |
|   | Country_2 | State_0 |   | Town_3 |
|   |   | State_1 |   | Town_4 |
|   |   | State_2 |   | Town_5 |
|   | Country_0 | State_0 | Town_1 | Town_2 |
|   |   | State_1 |   | Town_3 |
|   |   | State_2 |   | Town_4 |
|   | Country_1 | State_0 |   | Town_3 |
|   |   | State_1 |   | Town_4 |
|   |   | State_2 |   | Town_5 |

403 — Name
405 — SubName
407 — From
409 — To 501, 503A, 503B

Row 1 of 27

HIERARCHICAL GROUPING COLUMNS

BACKGROUND

Field of the Invention

The invention relates to table management. Specifically, the embodiments of the invention relate to a method and system for reorganizing tables to maintain a hierarchy or order of columns in response to user changes to the grouping of fields within columns.

Background

Tables are utilized in a large number of different applications. The applications include spreadsheet applications such as EXCEL® by Microsoft Corporation of Redmond, Wash., supply chain management applications such as SCM by SAP AG of Waldorf, Germany, database applications such as MySQL by MySQL AB of Uppsala, Sweden and similar applications. These applications access stored data, draw a table and insert the data into the table.

Tables are organizations of data as entries or records. Each entry or record includes a set of fields that are common amongst the entries. The entries can be displayed in rows and columns where each row corresponds to an entry and each column to a field of the entry. Often values in the fields of different entries are identical. Organizing entries with identical values in a given field can help the user establish relationships between the entries and identify information about the data set as a whole. The relationships between the entries can constitute a hierarchy of information within the table.

Some applications provide a grouping functionality to assist the user in manipulating the ordering of data to reveal a hierarchy that can be an explicit hierarchy or pseudo-hierarchy. The grouping function is performed by the application which draws the tables. As a result of grouping of any of the columns in the table, a hierarchy may be altered or lost. A table that includes grouped columns that are ordered left to right from fewest groupings to most groupings loses this order when a user ungroups a highly grouped column. As a result the hierarchy displayed by the ordering of the table columns is lost.

SUMMARY

Embodiments of the invention include a system and process that automatically responds to changes in displayed table data to determine and reestablish a hierarchy for the table. A column hierarchy order component checks each column of a table to determine the number of groupings of entries and reorders the columns based on the number of groupings. A column order at the time a table is loaded is saved and can be used to restore that original order.

BRIEF DESCRIPTION OF THE DRAWINGS

Embodiments of the invention are illustrated by way of example and not by way of limitation in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Figure 1:
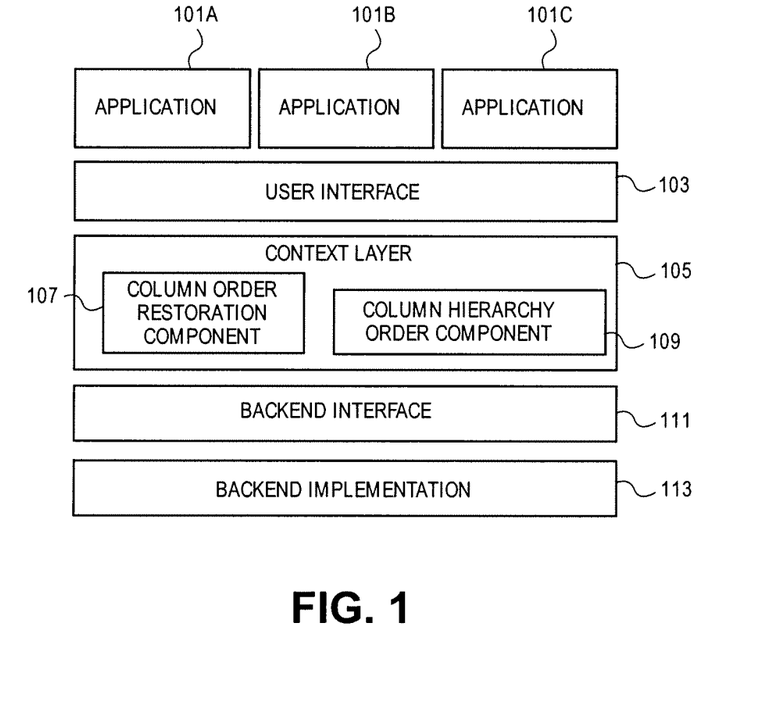
FIG. 1 is a diagram of a system for providing application independent and backend implementation independent column reordering components.

FIG. 1 is a diagram of a system for providing application independent and backend implementation independent hierarchy restoration and column order restoration. The system can include any number of applications 101A-C, a user interface layer 103, a context layer 105, a backend interface 111 and a backend implementation 113. One skilled in the art would appreciate that the illustrated components are abstracted and could be implemented through any number of components in the form of software components, hardware components and combinations thereof.

The applications 101A-C can be any type of applications including word processing programs, spreadsheet applications, supply chain management applications, database management applications and similar types of applications that utilize and rely on tables to display sets of data to a user. A set, as used herein, refers to any positive whole number of items including one item. The system can include any number of applications 101A-C that can be executed by a single computer system or a set of computer systems. The applications 101A-C rely on a user interface layer 103 to generate basic aspects of the application interface.

The user interface layer 103 can be a library, set of classes or similar components that are utilized by applications to generate basic user interface elements such as windows, menus, icons and similar user interface elements. The user interface layer 103 is implemented separately from the applications 101A-C to allow for reuse of the functionality of the user interface layer 103 across applications, to provide a consistent style, and to simplify programming requirements. The user interface layer 103 can be exposed to applications through an application programming interface (API) or similar interface, set of classes or library. The user interface layer 103 can be provided as part of an operating system, programming platform or environment such as Java® by Sun Microsystems of Santa Clara, Calif. or similar software.

The context layer 105 can be a library, set of classes or similar components available that are utilized by applications to provide a software environment to the applications, including providing functionality and data to the user of the applications. The context layer 105 can store data including user data, environment data and similar data. The context layer 105 can also include a column order restoration component 107 and a column hierarchy order component 109.

A column order restoration component 107 can store the column order of each table or a particular table that is loaded by the applications 101A-C. A separate instance of a column order restoration component 107 can be created for each table that is loaded by an application 101A-C. In another embodiment, a set of stored column order restoration components 107 store the column order data for multiple tables. The column order restoration component 107 can store column order data in any format or in any data structure including hash tables, lists, objects and similar data structures.

The column order restoration component 107 also receives requests, event, calls, interrupts or similar actions from applications 101A-C or user interface layer 103 during the use of the tables. For sake of clarity the example of servicing an event is presented. One skilled in the art would understand that other paradigms can operate on similar principles. The events can include an indicator for a table or similar table data. The indicator can be an object representing the table data, a link or pointer to the table data, an identifier for the table data or similar representation of the table data. The column order restoration component 107 returns the stored order to the application 101A-C or user interface layer 103 to allow the identified table to be redrawn and reorganized into the column order it was loaded, referred to herein as the original column order. In another embodiment, the column order restoration component 107 directly rearranges the display of table data before returning from the event that activated the column order restoration component 107. The column order restoration component 107 can be an event listener or similar object that services events.

A column hierarchy order component 109 is a class, library, object or similar component that is accessible by applications 101A-C or the user interface layer 103. The column hierarchy order component 109 receives calls, events, requests or similar actions from the applications 101A-C or user interface layer 103 that indicate a table to be reorganized. For sake of clarity the example of servicing an event is presented. One skilled in the art would understand that other paradigms can operate on similar principles. The events can include an indicator for a table or similar table data. The indicator can be an object representing the table data, a link or pointer to the table data, an identifier for the table data or similar representation of the table data. The column hierarchy order component 107 analyzes the indicated table to determine hierarchy information for the table. The column hierarchy order component 109 then reorders the table columns according to the determined hierarchy data. The table data is then returned to the requesting application 101A-C or to the user interface layer 103 to be redrawn or displayed to the user.

The backend interface (I/F) 111 is an abstraction of the communication components that allow the applications 101A-C, user interface layer 103 and context layer 105 to communicate with a backend implementation 113. The backend interface 111 can be implemented using any combination of remote function calls (RFC), remote procedure calls (RPC), open database connectivity (ODBC), Java® database connectivity (JDBC) or similar backend communication and interfacing technologies. The backend interface 111 can vary depending on the type of backend implementation 113. In one embodiment, multiple backend implementation 113 can be utilized. Each backend implementation 113 can have a separate backend interface 111 or share any combination of backend interfaces 111.

The backend implementation 113 can be any server such as a database management system, file system, web server or similar program. The backend system provides and manages data utilized by the applications 101A-C including application and user data. The backend implementation 113 can store table data, customization data, user data and similar types of data to be accessed by the applications 101A-C. The backend implementation 113 can be local to the machines executing the applications 101A-C or remote from the machines executing the applications 101A-C. The backend implementation 113 can exchange data with the applications through the backend interface 111. The data provided by the backend implementation 113 can be stored on fixed disks, such as arrays of hard drives, optical drives and similar storage systems. As a result, the access times for the data provided by the backend implementation 113 can be on the order of milliseconds, seconds or longer. Thus, it can be advantageous to minimize the number of times that the backend system is accessed to improve performance of the applications 101A-C.

The context layer 105 improves overall system performance including application 101A-C performance by storing data such as the column hierarchy order by the column order restoration component and performing functions such as the column hierarchy ordering and column order restoration. Storing these components and data locally and performing these functions independent of the backend implementation minimizes the number of accesses to the backend implementation 113 and improves system performance.

The components of the context layer 105 are independent of the backend implementation 113 and the applications 101A-C. Thus, the applications 101A-C do not have to replicate the functionality of the context layer components 107, 109 or manage the storage of the data in the context layer 105. Similarly, the applications 101A-C do not have to communicate with the backend implementation 113 to reorganize and manipulate the column hierarchy order or to restore a column hierarchy.

Figure 2:
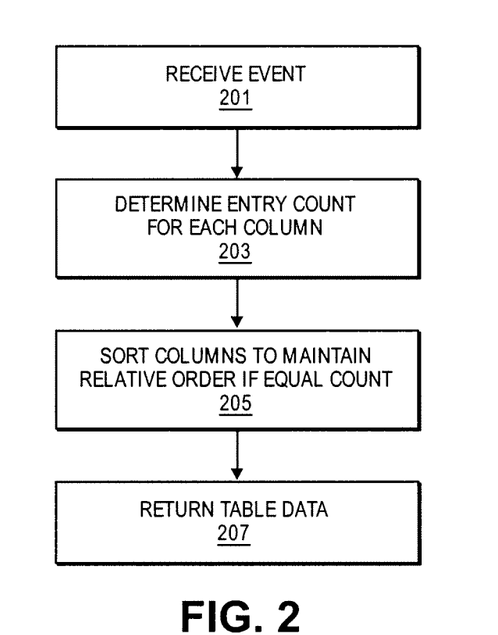
FIG. 2 is a flowchart of one embodiment of a process for column hierarchy determination and reordering.

FIG. 2 is a flowchart of one embodiment of a process for column hierarchy determination and reordering. In one embodiment, a user can direct that column hierarchy be determined and columns reorganized based on the inherent column hierarchy for a particular table through a user interface mechanism such as a menu, button or similar input mechanism. The interaction of the user with this input mechanism generates an event to be handled or passed to a column hierarchy order component (block 201). The event can include an indicator of the table for which the user wants the hierarchy restored.

In one embodiment, a column hierarchy order component executes in response to receiving an event or similar call from an application, the user interface layer or another context layer component. The method for invoking the column hierarchy order component can vary dependent on the implementation of the component. For example, the component can be implemented as a set of objects with methods available to other components and applications or as a listener for specific events generated within the system such as the accessing of table data or interaction of the user with a set of user interface input mechanisms. The received event includes an indicator or reference to a table to be analyzed and modified.

The column hierarchy order component iterates or similarly examines each column of a table to count the number of groupings in each column. A grouping is a merger of values that are identical in a column, all identical values can be merged or a subset of the identical values can be merged depending on the organization of the table. In one embodiment, the fewer the total number of groupings in a given column the higher the level it is in an inherent hierarchy for that table. In another embodiment, the organization of a hierarchy can be based on any formula utilizing the groupings count or similar column data. The example of total number of groupings is described herein for clarity. However, one skilled in the art would understand that the principles described in the context of grouping count can be applied to other hierarchy criteria. The groupings are tallied for each column of the table indicated by the event (block 203).

The column hierarchy order component then reorganizes the columns of the table based on the determined hierarchy (block 205). The type of reorganization based on hierarchy can be predetermined or selected by a user. In one embodiment, the tally data for each column is used to organize the columns left to right from lowest tally count to highest tally count. In cases of ties, the relative column order of two columns with equal tally counts can be maintained. In other embodiments, a tie-breaking scheme can be utilized to determine relative order of columns with equal tally counts. Any other type of ordering based on the tally count (e.g., high to low) can be implemented as selected by a programmer, administrator or user.

The column hierarchy order component then returns a reorganized table to the requesting application, user interface layer or context layer component. The reorganized table in the form of an indicator or similar representation of the table or table location is returned to the requesting application or user interface component (block 207). In another embodiment, the column hierarchy order component can directly manipulate and redraw the column for an application or component.

Figure 3A:
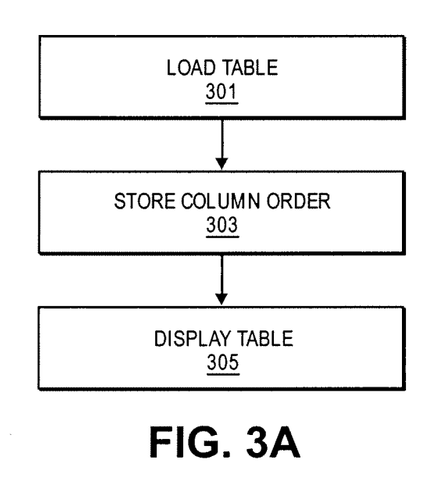
FIG. 3A is a flowchart of one embodiment of a process for saving original column order.

FIG. 3A is a flowchart of one embodiment of a process for saving original column order. The process can be executed by a column order restoration component, application, user interface, or similar component or any combination of these components. An application receives an input from a user that requires the display of table data. This input can be the opening of a file, project, the application itself of similar input. The application then generates a request to the user interface layer, context layer or backend interface to load the table to be displayed to a user (block 301).

The backend implementation responds to the request by returning the table data. The application, context layer or user interface layer determines the column order of the table. The column order can be encoded in any format and stored in any type of data structure (block 303). The data structure can be a shared data structure for multiple open tables or each table can have a separate instance of a data structure for storing original column order. In another embodiment, the original table can be stored or some portion of the table can be stored to preserve a record of the original column order. The stored column order can be deleted or removed when the table data is no longer used by the application, for example, when the application is closed.

The loaded table data is then returned to the user interface and application to draw and display the table (block 305). The application then allows a user to modify and rearrange the loaded table data. The original column order can be lost during use, but can be restored because it has been stored. Further, the restoration can be quick, because the requisite data is stored in the context layer and the backend implementation does not have to be accessed.

Figure 3B:
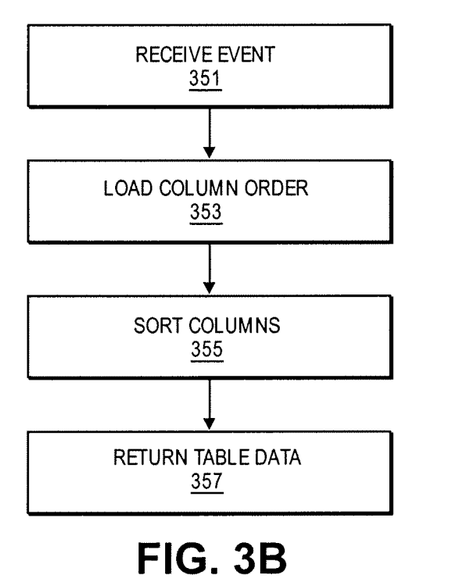
FIG. 3B is a flowchart of one embodiment of a process for loading and restoring original column order.

FIG. 3B is a flowchart of one embodiment of a process for loading and restoring an original column order. In one embodiment, a user can direct that column order be restored to an original order for a particular table through a user interface mechanism such as a menu, button or similar input mechanism. The interaction of the user with this input mechanism generates an event to be handled or passed to a column order restoration component (block 351). Again, for sake of clarity an example implementation using an event model is described for sake clarity. The event can include an indicator of the table for which the user wants the column order restored.

In one embodiment, a column order restoration component executes in response to receiving an event or call from an application or the user interface layer. The method for invoking the column order restoration component can vary dependent on the implementation of the component. For example, the component can be implemented as a set of objects with methods available to applications or as listeners for specific events generated within the system such as the accessing of table data or interaction of the user with a set of user interface input mechanisms. The received event includes an indicator or reference to a table to be analyzed and modified.

The column order restoration loads a stored column order for the table indicated by the event (block 353). The column order restoration component then reorganizes the columns of the table based on the stored column order (block 355). The reorganization based on stored column order can match the table column order exactly with the original column order. In another embodiment, the column order reorganization is limited to a subset of the total columns or similar alterations from the original column order can be made. In other embodiments, a stored column order may be retrieved that is not the original column order. The stored column order can be created at any time during the use of the table to preserve a particular column order.

The column order restoration component then returns a reorganized table to the requesting application or user interface component. The reorganized table in the form of an indicator or similar representation of the table or table location is returned to the requesting application or user interface component (block 357). In another embodiment, the column order restoration component redraws and manipulates the table before returning.

Figure 4:
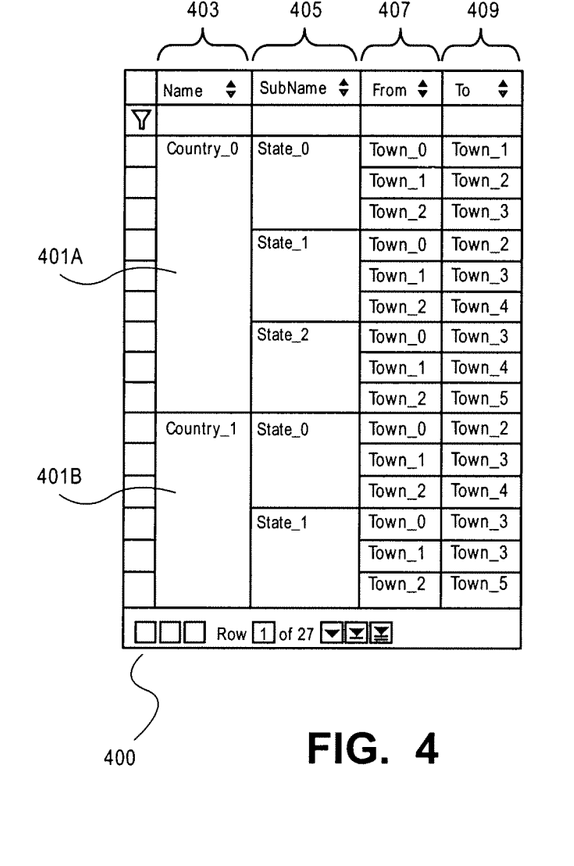
FIG. 4 is a diagram of one embodiment of a flat table in an original column order.

FIG. 4 is a diagram of one embodiment of a flat table in an original order. The illustrated table 400 is ordered based on an original loaded table order. The table 400 has four columns labeled 'name' 403, 'subname' 405, 'from' 407 and 'to' 409. The entries have been grouped in several of the columns. For example, the name column has been reduced to two groupings 401A and 401B. The groupings reveal an inherent hierarchy in the table data. For example, Country_0 includes State_0, State_1 and State_2, which each include specific from and to locations. The layout of the table from most highly grouped to least highly grouped allows the user to easily see relationships of values across all of the columns.

Figure 5:
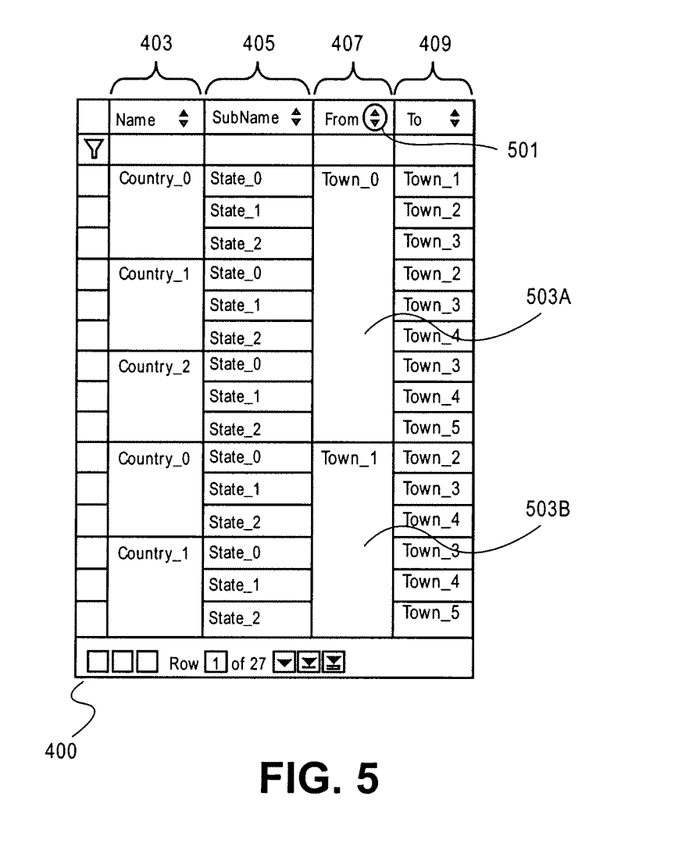
FIG. 5 is a diagram of one embodiment of a regrouped and reorganized flat table.

FIG. 5 is a diagram of one embodiment of a regrouped flat table. In the illustrated table 400, the table data has been reorganized by the user. The user has selected to group the data in column 407 using a grouping input mechanism 501. The table data is reorganized with the primary grouping focused on column 407. Other columns remain grouped within the constraints of the grouping of column 407. The primary groupings in the table are Town_0 503A and Town_1 503B. While some relationships between columns and entries are revealed, the hierarchy and organization of the table 400 are largely lost.

Figure 6:
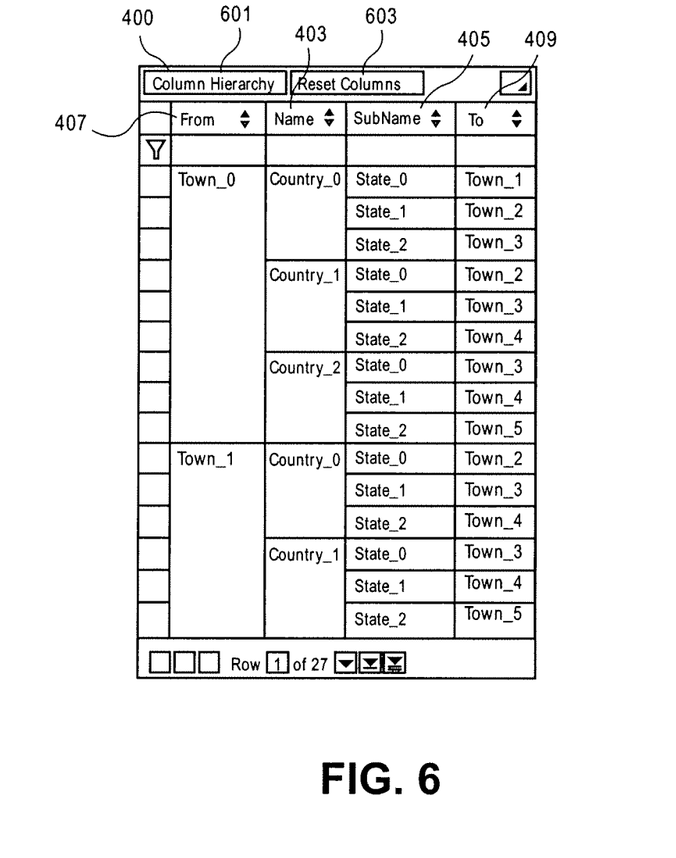
FIG. 6 is a diagram of one embodiment of a flat table with a restored column hierarchy.

FIG. 6 is a diagram of one embodiment of a flat table with a restored hierarchy. In the illustrated table 400, column hierarchy has been restored. The user can effect this change through the use of the column hierarchy order component that is activated in response to the user interaction with the column hierarchy input mechanism 601. In another embodiment, the column hierarchy order component can be automatically activated to restore the hierarchy. This function can be set or disabled by a user or administrator. In the table 400, the columns have been reordered from left to right with the smallest tally of groupings in the first column place and the highest tally of groupings in the last column place. The hierarchy is again visible to the user and the relationships more readily apparent between the values in the table.

The interface for the table 400 also includes a 'reset columns' input mechanism 603. A user could activate this input mechanism 603 to call the column order restoration component. In one embodiment, the column order restoration component would resent the column order to that illustrated in FIGS. 4 and 5. The column order restoration does not alter the groupings of data. In the examples provided, because no values have been altered and the data has not been sorted, if the reset columns button were activated in FIG. 6 then the table data would revert back to the format of FIG. 5.

In one embodiment, the column hierarchy order and column order restoration system can be implemented as hardware devices. In another embodiment, these components may be implemented in software (e.g., microcode, assembly language or higher level languages). These software implementations may be stored on a machine-readable medium. A "machine readable" medium may include any medium that can store or transfer information. Examples of a machine readable medium include a ROM, a floppy diskette, a CD-ROM, a DVD, flash memory, hard drive, an optical disk or similar medium.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method comprising:
receiving a selection of a column from columns of a table to change a primary grouping of rows from the table based on grouping row entries for the selected column;
displaying the table with a changed primary grouping of rows in the table;
receiving a call indicating the table with the changed primary grouping of rows and requesting restoring of a column hierarchy order for the table;
automatically determining, by a computer, a hierarchy of the table based on analyzing tally counts associated correspondingly with the columns of the table, wherein determining the hierarchy further comprises:
counting a number of groups present in a column from the indicated table to determine a tally count associated with the column, wherein a group is defined as adjacent identical entries in the column;
reorganizing the table to establish the column hierarchy order by reordering the columns displayed, based on the determined hierarchy of the table;
maintaining relative column order within the column hierarchy order when two or more tally counts associated correspondingly with two or more of the columns from the table are equal; and
displaying the table as reorganized.

2. The method of claim 1, further comprising:
storing a current order of the columns independently from the table before reorganizing the table.

3. The method of claim 2, further comprising:
storing the current order of the columns independently from the table in response to the call.

4. The method of claim 3, wherein the current order is stored in a local context layer.

5. The method of claim 1, wherein the reorganized table is displayed after a sorting of the columns in an increasing order based on the tally counts associated correspondingly with the columns of the table.

6. A system comprising:
data storage to store a database component; and
a computer coupled to the data storage to host an application, the computer comprising:
a user interface component to:
receive a selection of a column from columns of a table to change a primary grouping of rows from the table based on grouping row entries for the selected column;
draw the table on a display for the application, wherein the table is with a changed primary grouping of rows in the table;
a context component comprising,
a column hierarchy restoration component to:
count a number of groups present in a column from the table to determine a tally count associated with the column, wherein a group is defined as identical adjacent entries in the column;
arrange table columns for display based on determined tally counts for the columns of the table, the column hierarchy restoration component activated responsive to a change in the order of entries in one or more columns of the table displayed and the received selection for the change, and
a column order restoration component to return the displayed table to a previously stored column order; and
a backend interface component to retrieve and store table data for the table in the database component.

7. The system of claim 6, wherein the context component is local to the user interface component and the application.

* * * * *